Patented June 29, 1926.

1,590,795

UNITED STATES PATENT OFFICE.

EDWIN T. ASPLUNDH, OF BARBERTON, OHIO, ASSIGNOR TO PITTSBURGH PLATE GLASS COMPANY, A CORPORATION OF PENNSYLVANIA.

PROCESS OF INCREASING THE DENSITY OF FINELY-DIVIDED MATERIAL.

No Drawing. Application filed September 22, 1924. Serial No. 739,198.

The invention relates to a process for increasing the density of finely divided, relatively light, finely powdered soda ash, which, for various reasons, it becomes desirable to convert into dense soda ash of granular consistency. Heretofore this has been accomplished in two ways, one by the application of a high degree of heat without the use of moisture, and the other by use of water in connection with heat, which latter has been practiced to the greater extent, largely because the material thus produced is granular. The process of the present invention involves a departure from both of the foregoing processes and has for its principal objects:

The provision of an improved process; (1) which can be practiced to produce an ash having a greater degree of density than the ash produced by the water densifying process above set forth, as a dense ash involves less loss in use, requires less space in shipment, and smaller containers than a lighter ash, and is less dusty and hence causes less damage to furnace flues and is more convenient to handle; (2) which gives an ash freer from contamination than the processes heretofore practiced, the heat treatment at high temperatures causing the detachment of small particles of fire brick from the furnace walls which mix with the ash, and the water treatment introducing any impurities which may be present in the water employed; (3) which is cheaper to manufacture, in that no heat and less labor is required; and (4) in which the size of the particles constituting the finished product can be better controlled, as well as the density thereof, and a more uniform density in the final product secured.

In carrying out the process, the light, very finely divided soda ash weighing from 26 to 30 pounds per cubic foot is subjected to a very high pressure in a suitable press to compress it into solid dense blocks or briquettes, such pressure depending upon the degree of density desired, but being ordinarily in the neighborhood of 50,000 pounds per square inch.

In order to reduce the briquettes to granular form, they are subjected to a crushing action till they are reduced to granular form having the desired degree of fineness depending on the purpose for which the product is intended to be used. There will, of course, be present in the material a plurality of grades other than the one to which the bulk of the material belongs and such other grades may be removed by screening, so that a body of material is secured having a high degree of uniformity as to the size of particles. The particles of a size above or below the desired grade may be saved and sold separately if there is a demand for such grades, or they may be reconverted into briquettes and reduced again to granular form.

The product secured is thus of uniformity as to size of particles, and the size of particles and their density is under control and may be regulated to suit requirements, a condition not present with the processes heretofore employed. This product is also free from particles of brick, such as are ordinarily present to a greater or less degree in a product produced by the heat densifying process, and is free from any impurities, such as are often introduced into the ash by the water used for moistening it preliminary to heating it in the water densifying process now employed.

In addition to the greater purity and the control as to density and uniformity of the product, the process has an advantage in cost, the power required for densifying and crushing being considerably lower in cost than that of the heat required in the heat and water densifying processes heretofore employed.

The formation of the ash into blocks or briquettes, as an intermediate step in the process, also has an advantage in the matter of storage. The light powdered ash requires more space than the blocks and deteriorates in the course of time, while the solid blocks can be kept indefinitely without deterioration. The light ash is therefore formed into the blocks or briquettes as soon as it is made, and is later crushed and screened in accordance with requirements.

What I claim is:

1. A process of densifying and granulating relatively light powdered soda ash, substantially free from water, which consists in subjecting such ash to very heavy pressure so as to form it into solid briquettes having the required degree of density, and then pulverizing the briquettes into granular form of the desired degree of fineness.

2. A process of densifying finely divided soda ash, substantially free from water, which consists in subjecting such ash to very heavy pressure so as to form it into solid briquettes having the required degree of density, pulverizing the briquettes into finely divided form, and finally grading the divided material thus produced.

In testimony whereof, I have hereunto subscribed my name this 17th day of September, 1924.

EDWIN T. ASPLUNDH.